United States Patent [19]

Dzhaparidze et al.

[11] 4,083,757
[45] Apr. 11, 1978

[54] ELECTROCHEMICAL PROCESS FOR PRODUCING MANGANESE DIOXIDE

[76] Inventors: Levan Nikolaevich Dzhaparidze, ulitsa Saburtalinskaya, 37, kv. 9; Temuri Alexandrovich Chakhunashvili, ultisa Plekhanova, 2/8; Venera Romanovna Maisuradze, prospekt Akakiya Tsereteli, korpus 5, kv. 54; Raul Vladimirovich Chagunava, ulitsa Pekinskaya, 2, kv. 23, all of Tbilisi; Zurab Yasonovich Kervalishvili, Rustavi, prospekt Lenina, 14, kv. 3; Nodar Georgievich Sukharulidze, Rustavi, Saradzhishvili, 51, kv. 24, both of Gruzinskaya; Dali Georgievna Otiashvili, prospekt V. Pshavela, 11, kv. 12, Tbilisi; Alexei Pavlovich Epik, ulitsa Gorkogo, 9, kv. 19, Kiev, all of U.S.S.R.

[21] Appl. No.: 819,105

[22] Filed: Jul. 26, 1977

[51] Int. Cl.² .............................................. C25B 1/30

[52] U.S. Cl. ...................................................... 204/83
[58] Field of Search .................................... 204/83, 96

[56] References Cited

U.S. PATENT DOCUMENTS 3,951,765   4/1976   Everett .................................. 204/96

*Primary Examiner*—R. L. Andrews
*Attorney, Agent, or Firm*—Steinberg & Blake

[57] ABSTRACT

An electrochemical process for producing manganese dioxide by electrolysis of a solution of manganese sulphate containing 100 to 150 g/l of manganese sulphate and 20 to 30 g/l of sulphuric acid and having a temperature of from 90° to 95° C at an anodic current density of from 80 to 100 A/m² using a titanium anode coated with a layer of titanium carbide with a thickness of from 50 to 100 mcm and a cathode. The resulting manganese dioxide is useful in the production of electric cells as the active mass of the positive electrode fo manganeze-zinc chemical sources of current.

2 Claims, No Drawings

ELECTROCHEMICAL PROCESS FOR PRODUCING MANGANESE DIOXIDE

The present invention relates to the art of electrochemistry and, more specifically, to an electrochemical process for producing manganese dioxide.

The resulting manganese dioxide is useful as an active mass of the positive electrode for manganese-zinc chemical current sources.

Known in the art are electrochemical processes for producing manganese dioxide by way of electrolysis of a solution of manganese sulphate using lead and graphite anodes and cathodes.

A principal disadvantage of said processes resides in a single use of anode and in contamination of the resulting product with the electrode material.

Also known in the art is a process for producing manganese dioxide, wherein electrolysis is carried out using a titanium anode and lead or graphite cathode with an anodic current density ranging from 50 to 100 A/m² (cf. M.Ya.Fioshin, "Advance in electrosynthesis of inorganic compounds" Moscow, "Khimija" Publishing House, 1974, p. 112).

The titanium anode features a disadvantage residing in that its potential is increased during the electrolysis (and, consequently, increased bath voltage due to the formation of an oxide film at the anode surface which film possesses a high ohmic resistance. Furthermore, as a result of increased bath voltage, current yield is lowered.

It is an object of the present invention to reduce the bath voltage.

It is another object of the present invention to increase the current yield.

Still another object of the present invention is to increase mechanical strength of the cathode.

It is an object of the present invention to eliminate the above-mentioned disadvantages.

The present inventon is directed to the provision, by way of selecting anodic protective coatings, of an electrochemical process for producing manganese dioxide which would make it possible to reduce bath voltage and increase current yield.

These objects are accomplished by that in an electrochemical process for producing manganese dioxide by electrolysis of an aqueous solution of manganese sulphate containing 100 to 150 g/l of manganese sulphate and 20 to 30 g/l of sulphuric acid and having temperature of 90°–95° C at an anode current density of from 80 to 100 A/m² using a cathode and a titanium anode, in accordance with the present invention use is made of a titanium anode coated with a layer of titanium carbide with a thickness ranging from 50 to 100 mcm.

The use of such an anode makes it possible to reduce bath voltage down to 1.8–1.9 and increase current yield up to 97–99%.

To ensure a longer service life of cathodes it is advisable to employ chromium-nickel steel as material for cathodes, the steel containing 18 to 23% by weight of chromium and 20 to 28% by weight of nickel and being alloyed with copper, molybdenum, titanium, silicon and manganese.

The process according to the present invention is performed in the following manner.

An electrolyzer is filled with an electrolyte comprising an aqueous solution of manganese sulphate containing 100 to 150 g/l of MnSO₄ and 20 to 30 g/l of sulphuric acid. The electrolyte is heated to a temperature of from 90° to 95° C. As the cathodes use is made of graphite or lead cathodes in the form of bars or plates and, in addition, for the purpose of lowering mechanical strain of cathodes, use is made of a cathode made of chromium-nickel steel containing 18 to 23% by weight of chromium and 20 to 28% by weight of nickel and alloyed with copper, molybdenum, titanium, silicon and manganese.

As anodes use is made of titanium bars or plates coated with a layer of titanium carbide with a thickness within the range of from 50 to 100μ. To this end, a titanium bar or plate is placed into a container with pure carbon black (99.8% by weight of carbon) and then the container with the titanium bar or plate is placed into a furnace, wherein it is heated to a temperature within the range of from 900° to 1,100° C in the atmosphere of pure hydrogen (in order to avoid oxidation of titanium with the air oxygen). Duration of the carbidization stage is within the range of from 20 minutes to 2 hours.

The electrolysis is conducted at an anodic current density of from 150 to 300 A/m².

The electrolysis proceeds according to the scheme:

$$MnSO_4 + 2H_2O \rightarrow MnO_2 + H_2SO_4 + H_2$$

The sulphuric acid resulting from the electrolysis is neutralized with metallic manganese, manganese carbonate or reduced manganese ore.

The bath voltage is 1.8 to 2.2 V and the electrolysis time is within the range of from 200 to 1,000 hours. On completion of electrolysis, the anodes with manganese dioxide deposited thereon are put out of the electrolyser and then the deposit is mechanically separated from the anode.

After the removal of the anodic deposit of manganese dioxide comprising a solid and brittle product, the titanium anode coated with the layer of titanium carbide can be repeatedly used for another cycle of electrolysis. The resulting lumps of manganese dioxide are crushed to obtain powder with a particle size of equal or below 0.20 mm. Then the thus-produced product is washed with water or with a 2–3% solution of soda and dried at a temperature within the range of from 90 to 105° C.

The current yield of the product is 97 to 99%. The final product contains 89 to 92% by weight of MnO₂.

The resulting manganese dioxide represents γ-modification of MnO₂. Owing to the use of a titanium anode coated with a layer of titanium carbide in the process for producing manganese dioxide by the process according to the present invention, the bath voltage is decreased and the current yield is increased. As compared to graphite and lead anodes, a titanium anode coated with a layer of titanium carbide, features an increased mechanical strength, wherefore it can be repeatedly employed in the process. The cathode as employed in the process according to the present invention is made of a chromium-nickel steel containing 22 to 23% by weight of chromium and 20 to 28% by weight of nickel and doped with copper, molybdenum, titanium, silicon and manganese has a high mechanical strength and is not subjected to mechanical strains during the use thereof.

For a better understanding of the present invention, some specific examples illustrating the process for producing manganese dioxide are given hereinbelow.

EXAMPLE 1

An electrolyzer is filled with an electrolyte containing 100 g/l of $MnSO_4$ and 30 g/l of sulphuric acid and heated to a temperature of from 90° to 95° C. As the anode use is made of a titanium bar with the diameter of 20 mm coated with a layer of titanium carbide with the thickness of 50μ. As the cathode use is made of a graphite bar with the diameter of 20 mm. The titanium rod is previously placed into a container with pure carbon black (99.8% by weight of carbon), and then the container with the rod is placed into a furnace and heated to a temperature within the range of from 900° to 1,100° C in the atmosphere of pure hydrogen (to avoid oxidation of titanium with air oxygen). The duration of the carbidization process is 2 hours.

The electrolysis is conducted at the anodic current density of 80 $A/m^2$ and cathodic current density of 150 $A/m^2$. The bath voltage is 1.8–1.9 V. The sulphuric acid resulting from electrolysis is neutralized with metallic manganese. The electrolysis duration is 350 hours. On completion of the electrolysis, the anode with deposited thereon manganese dioxide is taken out of the electrolyzer and the anodic deposit is mechanically separated from the electrode base. The resulting lumps of manganese dioxide are crushed to a powder with the particle size of below 0.2 mm and then washed with water and dried at a temperature within the range of from 90° to 105° C. The product current yield is 98.5%. The thus-obtained product contains the following components, wt.%: 90.3 $MnO_2$, humidity 2.3; Ti and C — none.

Capacity of one manganese-zinc Leclanche cell for a battery pocket flash-light (overall dimensions of the cell: diameter 20 mm, height 55 mm, mass 40 g) manufactured using the above-described manganese dioxide produced by the process according to the present invention, upon continuous conditions of discharging on the resistance of 3.33 ohm to the final voltage of 0.67 V is 1.12 A.hr, while on the resistance of 117 Ohm to the final voltage of 1.0 V –1.34 A.hr.

EXAMPLE 2

An electrolyzer is filled with an electrolyte containing 130 g/l $MnSO_4$ and 25 g/l of sulphuric acid and heated to a temperature of from 90° to 95° C. As the anode use is made of a titanium bar with the diameter of 15 mm coated with a layer of titanium carbide with the thickness of 70mcm; as the cathode use is made of a bar with the diameter of 10 mm made of a chromium-nickel steel having the following composition, % by weight:

| chromium | 23 | molybdenum | 2.5 |
|---|---|---|---|
| nickel | 28 | titanium | 0.5 |
| carbon | 0.06 | copper | 3.1 |
| silicon | 0.8 | iron - the balance. | |
| manganese | 0.8 | | |

Anodic current density is 100 $A/m^2$; cathodic current density is 200 $A/m^2$. The bath voltage is 1.9–2.2. The resulting sulphuric acid from the electrolytic process is neutralized with manganese carbonate. The electrolysis duration is 320 hours. On completion of the electrolysis, the anode with the deposited thereonto manganese dioxide is extracted from the electrolyzer and the anodic deposit is then mechanically separated from the electrode body. The thus-obtained lumps of manganese dioxide are crushed to a powder with a particle size of 0.2 mm, then washed with a solution of soda and dried at a temperature of from 90° to 105° C. The current yield of manganese dioxide is 98%. The resulting product contains the following components, percent by weight: 91.40 of $MnO_2$, Ni — none; Fe — 0.05; Cu — 0.003; Cr — 0.05; humidity 3.5.

Capacity of a single manganese-zinc Leclanche cell for a battery pocket flash-light manufactured using the thus-obtained manganese dioxide for continuous discharge conditions on the resistance of 3.33 ohm is 1.08 A.hr. and on the resistance of 117 Ohm it is 1.31 A.hr.

EXAMPLE 3

An electrolyzer is filled with an electrolyte containing 120 g/l of $MnSO_4$ and 20 g/l of sulphuric acid and then heated to a temperature of from 90° to 95° C. As the anode use is made of a titanium plate with the width of 110 mm, length 180 mm and thickness 3 mm coated with a layer of titanium carbide with the thickness of 100 mcm; as the cathode use is made of a plate with the width of 40 mm, length 180 mm and thickness 4 mm made of a chromium-nickel steel of the following composition, per cent by weight:

| chromium | 19 | carbon | 0.05 | manganese | 0.8 |
|---|---|---|---|---|---|
| nickel | 21 | silicon | 2.5 | molybdenum | 3.0 |
| titanium | 0.4 | copper | 2.3 | iron - the balance. | |

Anodic current density is 100 $A/m^2$; cathodic current density is 300 $A/m^2$. The bath voltage is 2.0 to 2.2 V. The sulphuric acid resulting from the electrolysis is neutralized with manganese carbonate.

The electrolysis duration is 320 hours. The current yield of manganese dioxide is 97%. The resulting product contains the following components, percent by weight: 90.3 $MnO_2$, Ni — none; Fe 0.04; Cu 0.003; Cr 0.03; humidity 2.5.

Capacity of a single manganese-zinc Leclanche cell for a pocket flash-light battery manufactured using the thus-obtained manganese dioxide under the conditions of continuous discharge on the resistance of 3.33 ohm is 1.13 A.hr. and on the resistance of 117 Ohm – 1.35 A.hr.

EXAMPLE 4

An electrolyzer in filled with an electrolyte containing 120 g/l of $MnSO_4$ and 25 g/l of sulphuric acid and then heated to a temperature of from 90° to 95° C. As the anode use is made of a titanium bar with the diameter of 20 mm coated with a layer of titanium carbide with the thickness of 100 mcm, and as the cathode use is made of a lead plate. Electrolysis is carried out at the anodic current density of 100 $A/m^2$ and cathodic current density of 200 $A/m^2$. The bath voltage is 2.2 to 2.4 V. The sulphuric acid resulting from the electrolysis is neutralized with metallic manganese. The electrolysis duration is 380 hours. On completion of the electrolysis the anodes with manganese dioxide deposited thereon are removed from the electrolyzer and the anodic deposit is then mechanically separated from the electrode base. The resulting lumps of manganese dioxide are crushed to a powder with a particle size of less than 0.20 mm and then washed with water and dried at a temperature within the range of from 90° to 105° C.

The current yield of manganese dioxide is 98%. The resulting product contains the following components, percent by weight: 90.5 $MnO_2$, Ni — none, Fe 0.02, Cu — none, humidity — 3.1.

Capacity of a single manganese-zinc Leclanche cell for a pocket flash-light battery manufactured using the thus-obtained manganese dioxide under the conditions of continuous discharge on the resistance of 3.33 ohm is 1.15 A.hr., and on the resistance of 117 Ohm – 1.28 A.hr.

What is claimed is:

1. An electrochemical process for producing manganese dioxide comprising electrolysis of an aqueous solution of manganese sulphate containing 100 to 150 g/l of manganese sulphate and 20 to 30 g/l of sulphuric acid and having a temperature of from 90 to 95° C at an anodic current density of from 80 to 100 A/m$^2$ using a cathode and a titanium anode coated with a layer of titanium carbide with a thickness of from 50 to 100 mcm.

2. A process as claimed in claim 1, wherein use is made of cathode manufactured of a chromium-nickel steel containing 18 to 23% by weight of chromium and 18 to 23% by weight of nickel and alloyed with copper, molybdenum, titanium silicon and manganese.

* * * * *